No. 889,630. PATENTED JUNE 2, 1908.
J. MEIKLE.
BOLT OPERATING AND AUTOMATIC LOCKING MECHANISM.
APPLICATION FILED JUNE 27, 1907.
2 SHEETS—SHEET 1.
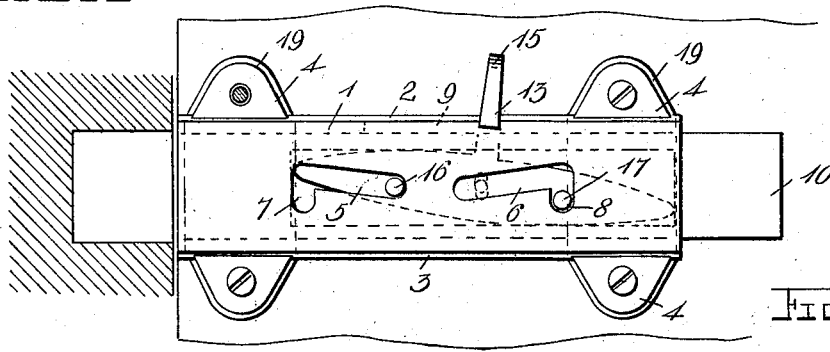
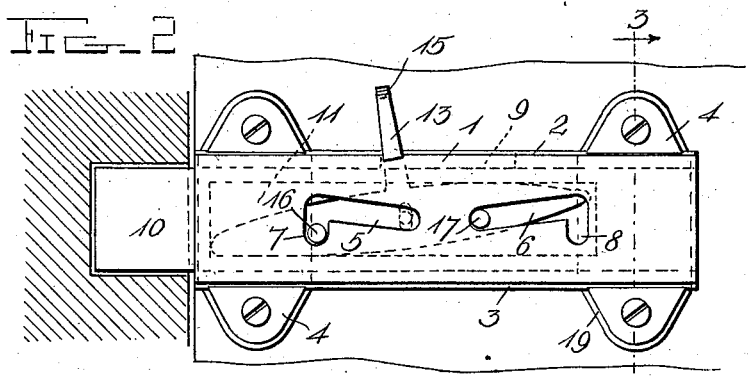
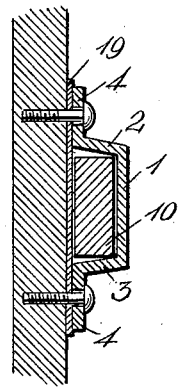
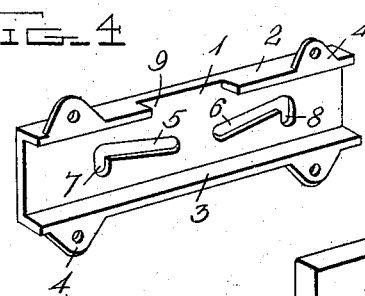
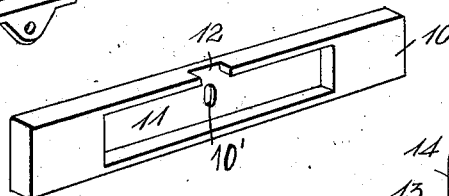
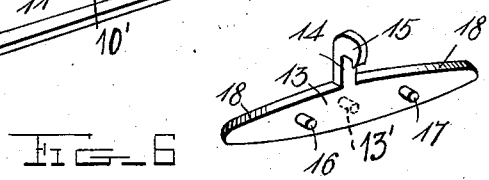
Witnesses
C. Ellenbecker
C. H. Griesbauer
Inventor
John Meikle
by H. B. Willson & Co.
Attorneys No. 889,630.
PATENTED JUNE 2, 1908.
J. MEIKLE.
BOLT OPERATING AND AUTOMATIC LOCKING MECHANISM.
APPLICATION FILED JUNE 27, 1907.
2 SHEETS—SHEET 2.
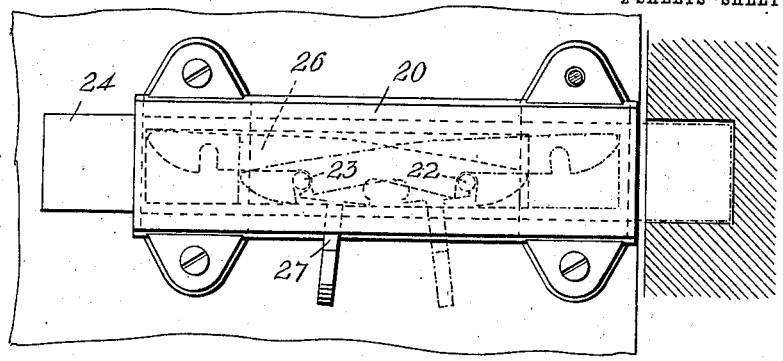
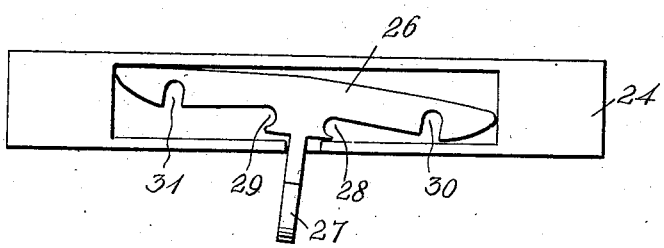
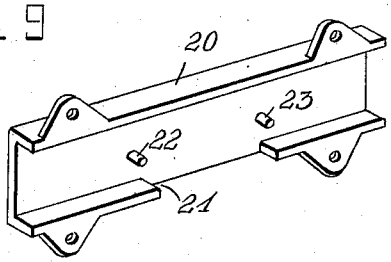
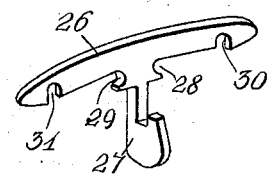
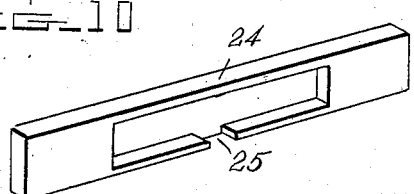
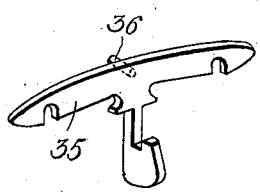
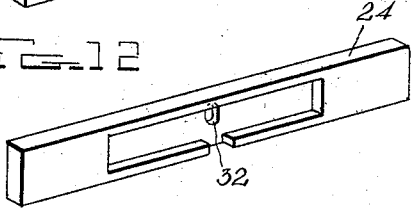
Witnesses
Inventor
John Meikle
by his Attorneys

UNITED STATES PATENT OFFICE.

JOHN MEIKLE, OF WILKINSBURG, PENNSYLVANIA.

BOLT-OPERATING AND AUTOMATIC LOCKING MECHANISM.

No. 889,630.  Specification of Letters Patent.  Patented June 2, 1908.

Application filed June 27, 1907. Serial No. 381,168.

*To all whom it may concern:*

Be it known that I, JOHN MEIKLE, a subject of Great Britain, residing at Wilkinsburg, in the county of Allegheny and State of Pennsylvania, have invented certain new and useful Improvements in a Bolt-Operating and Automatic Locking Mechanism; and I do declare the following to be a full, clear, and exact description of the invention, such as will enable others skilled in the art to which it appertains to make and use the same.

This invention relates to improved means for throwing a bar, rod or bolt back and forth and for automatically locking it in either of its extreme positions.

The object of the invention is to provide a simple, cheap and easily assembled mechanism for longitudinally moving a bar, bolt or rod back and forth and for automatically locking it in its extreme positions and which is adapted for application to a variety of purposes such as the operation of a railway signal switch, for operating a clutch to throw a belt from a fixed to a loose pulley and vice versa or for an emergency or other brake.

The invention consists of three essential or main members—a guide member, an operating member and an operated member.

In the accompanying drawings, Figure 1 represents a front elevation of the device applied with the bolt in its unlocked position; Fig. 2 represents a similar view showing the bolt in locked position; Fig. 3 represents a cross section taken on the line 3—3 of Fig. 2; Fig. 4 represents a perspective view of the casing taken from the rear thereof; Fig. 5 represents a perspective view of the bolt; Fig. 6 represents a similar view of the operating member; Fig. 7 represents a front elevation of a modified form showing the bolt in its unlocked position in full lines and in its locked position in dotted lines. Fig. 8 represents a similar view showing the casing removed; Fig. 9 represents a perspective view of the casing looking at it from the rear or inside; Fig. 10 represents a perspective view of the bolt; Fig. 11 represents a perspective view of the operating member; Fig. 12 represents a perspective view a slightly modified form of bolt; Fig. 13 represents a perspective view of the operating member for use in connection with the bolt shown in Fig. 12.

The invention is herein shown and described as applied to a door-bolt or latch of a horizontal type. In the form illustrated in Figs. 1 to 6, a guide member or casing 1 is shown open at both ends and composed of a plate having depending flanges 2 and 3 at its opposite sides which are provided with laterally-extending apertured attaching lugs as 4. The side flanges 2 and 3 are preferably flared outwardly to prevent binding of the bolt therebetween. This casing is provided in its face or top with two slots 5 and 6 which are arranged substantially horizontal or inclined downwardly towards each other and provided at their outer ends in their lower edges with notches or slots 7 and 8 communicating with the slots 5 and 6. In the flange 2 of the casing is a cutout portion or recess 9 for a purpose hereinafter described. Mounted to slide in the casing 1 is a bolt 10 having a recess 11 formed longitudinally therein and having a recess or notch 12 in its upper edge communicating with the recess 11 for a purpose to be described.

An operating member in the form of a T-shaped cam lever 13 is disposed in the recess 11 of the operated member or bolt 10 with its stem 14 projecting through the notch 12 in the bolt 10 and the recess 9 in the casing 1 and is provided with a finger piece 15. On one face of the head of the cam member 13 are two laterally-projecting spaced studs 16 and 17 which are adapted to project through the slots 5 and 6 in the casing 1 when the parts are assembled. The head of the cam member 13 is preferably made of a length to correspond with the length of the recess 11 in the bolt 10 or slightly shorter than said recess and the opposite edges thereof are curved longitudinally, as shown in the drawings with their side edges preferably beveled as shown at 18 to facilitate the operation of the member 13 without binding. In the use of this form of the invention, the cam member 13 is placed in the recess 11 of the bolt 10 with the studs 16 and 17 projecting outwardly and the casing 1 is placed thereover with the studs extending through slots 5 and 6 therein and with the stem 14 extending through the recesses 12 and 9. The casing is then fastened to a door or other object by means of screws which are passed through the apertures in the laterally extending lugs 4. Spacing plates as 19 are preferably arranged between the casing and the door to prevent the sliding of the bolt from marring the surface of the door. In Fig. 2, the bolt is shown in one of its extreme positions locked by the stud 16 which engages the notch 7 of the slot 5 and holds said bolt locked until said stud is raised out of the notch 7 into the slot 5 with which it communicates. With the stud 17 as a fulcrum, the actuating arm or stem 14 of the cam at the first impulse of the finger tip rocks the member 13 and raises the stud 16 out of the notch 7 into the slot 5 where it is free to move until both studs 16 and 17 with the attached cam head or cross-bar 13 are moved to the other extremity where the pin 17 drops into the notch 8 at the end of the slot 6, the stud 16 may then used as a fulcrum. The dropping of the studs into the notches at the opposite ends of the slots, locks the bolt in either of its extreme positions and holds it against accidental or fraudulent operation.

The two forms shown in Figs. 7 to 12 are very similar and are adapted for use in the reverse position to that shown in Figs. 1 to 6 with the operating finger piece or actuating arm projecting downward. The casing 20 is similar to the casing 1 except that it has a recess 21 in its lower instead of in its upper edge to permit the passage of the actuating arm and is provided on its inner face with spaced laterally-projecting studs 22 and 23 for engagement with notches in the operating member, as hereinafter described. The operated member or bolt 24 is similar to the bolt 10 except that it has a recess or notch 25 in its lower instead of in its upper edge. The operating cam member 26 has its upper edge curved longitudinally and its lower edge inclined upwardly toward the stem 27 and provided with notches 28 and 29 adjacent said stem and at its outer ends with notches 30 and 31 arranged at right angles to the notches 28 and 29. These notches 28 and 29 and 30 and 31 are adapted to engage the studs 22 and 23 on the casing 20 for operating and locking the bolt, as described in the operation of the invention, shown in Figs. 1 to 6. The contour of the under side of the cam 26 corresponds to the shape of the slots 5 and 6 in Fig. 1 and in the absence of the other side of the guiding slots, the curved upper surface of the cam 26 rocks on the side wall of the recess in the bolt 20.

The form shown in Figs. 12 and 13 differs slightly from that shown in Figs. 7 to 11, the casing being of the same construction and the bolt being also similar except that it has a transversely-extending slot 32 in the wall of its cam holding recess similar to the slot 10' shown in Figs. 1, 2 and 5 and the cam member 35 is the same as that shown in Fig. 7, except that it has a laterally-projecting stud 36 on its inner face for operation in the slot 32 in the bolt similar to the stud 13' shown in Figs. 1, 2 and 6. These studs and slots are designed to prevent lost motion.

In the operation of the device shown in Figs. 7 to 13 in which the actuating arm of the operating member projects downwardly and the pins 22 and 23 are fixed to the casing the movement of the lever or actuating arm 27 raises the slot or notched arm of the cam from its engagement with the stud 23 and the cam with the bolt moves in the direction of the impulse to the extremity of its throw where the pin or stud 22 engages with the outer notch in the other end of the cam member. The tips of the cam member being in touch with the ends of the recesses in the bolt, or pin 36 shown in Fig. 13, which engages the elongated hole or slot in the rear wall of the recess in said bolt, carries the bolt to and fro as desired.

I claim as my invention,—

1. The combination of a fixed plate provided with a guide, an operated member provided with means for receiving a thrust longitudinally, and a T-shaped cam provided with means for engaging the guide on said plate and operable by a single thrust in the direction of movement of the operated member to unlock, move longitudinally, and lock said operated member.

2. The combination of a member provided with guiding means, an operated member movable longitudinally relatively to said guide carrying member and having a recess in one side thereof, an operating member loosely disposed in the recess of said operated member and movable independently relatively thereto, and means carried by said operating member for engagement with said guiding means for moving said operated member longitudinally and locking it in one of its extreme positions.

3. The combination of a casing provided with guiding means having a recess extending longitudinally thereof, a bolt slidable in said casing and having a recess in one side thereof, and a notch in one wall of said recess registering with the recess in said casing, a T-shaped operating member, arranged in the recess in said bolt with its stem projected through the notch in the bolt and the recess in the casing, and provided with a finger piece, and means carried by said operating member for engagement with said guiding means for moving said bolt back and forth and locking it in its extreme positions.

4. The combination of a guide casing having a recess extending longitudinally thereof, a bolt slidable in said casing and having a recess in one side thereof, and a notch in one wall of said recess registering with the recess in said casing, a T-shaped operating member arranged in the recess in said bolt with its stem projected through the notch in the bolt and the recess in the casing, and having the outer edge of its head curved longitudinally, longitudinally-spaced studs projecting from one face of said operating member, said casing having longitudinally-spaced slots inclined downwardly toward each other for engagement by said studs whereby said bolt may be moved longitudinally back and forth and locked in its extreme positions.

5. The combination of a guide member having spaced slots inclined downwardly toward each other and provided with communicating slots or notches at the upper ends thereof, an operated member slidable in said guide member and having a recess in one side thereof, an operating member arranged in the recess of said operated member, and having longitudinally spaced studs extending through said recess into the slots in said guide member and a handle for moving said operating member, whereby said operated member is moved back and forth, and one of said studs being adapted to engage one of said notches and lock the operated member in its extreme position.

In testimony whereof I have hereunto set my hand in presence of two subscribing witnesses.

JOHN MEIKLE.

Witnesses:
 CHAS. S. LEPLEY,
 FRED STOUT.